(12) United States Patent
Altman et al.

(10) Patent No.: US 6,657,157 B1
(45) Date of Patent: Dec. 2, 2003

(54) METHOD, SYSTEM AND PRODUCT FOR PRODUCING A REFLECTIVE MASK MIRROR AND FOR ABLATING AN OBJECT USING SAID REFLECTIVE MASK MIRROR

(75) Inventors: Zino Altman, Newtown, PA (US); Edward Polkowski, Lloyd Harbor, NY (US); Jay Brandinger, Pennington, NJ (US); Brian Hoffman, Princeton, NJ (US)

(73) Assignee: Westar Photonics, Inc., Pennington, NJ (US)

( * ) Notice: Subject to any disclaimer, the term of this patent is extended or adjusted under 35 U.S.C. 154(b) by 0 days.

(21) Appl. No.: 09/589,310

(22) Filed: Jun. 7, 2000

(51) Int. Cl.[7] ................ B23K 26/00; B23K 26/06; B23K 26/02
(52) U.S. Cl. .................. 219/121.68; 219/121.69; 219/121.74; 219/121.82; 219/121.83
(58) Field of Search .................. 219/121.11–121.86

(56) References Cited

U.S. PATENT DOCUMENTS

| | | | | | |
|---|---|---|---|---|---|
| 3,853,398 | A | * | 12/1974 | Kano | 355/43 |
| 5,359,176 | A | * | 10/1994 | Balliet et al. | 355/53 |
| 5,502,313 | A | * | 3/1996 | Nakamura et al. | 359/15 |
| 5,663,826 | A | * | 9/1997 | Tsuda et al. | 264/401 |
| 5,896,163 | A | * | 4/1999 | Tsuda et al. | 219/121.84 |
| 5,948,289 | A | * | 9/1999 | Noda et al. | 250/559.26 |
| 6,037,564 | A | * | 3/2000 | Tatah | 219/121.69 |
| 6,080,959 | A | * | 6/2000 | Komplin | 219/121.71 |
| 6,190,012 | B1 | * | 2/2001 | Ishikura | 351/212 |
| 6,313,435 | B1 | * | 11/2001 | Shoemaker et al. | 219/121.7 |
| 6,335,151 | B1 | * | 1/2002 | Ausschnitt et al. | 430/322 |
| 2001/0030740 | A1 | * | 10/2001 | Mori et al. | 355/53 |
| 2001/0045418 | A1 | * | 11/2001 | Brandinger et al. | 219/121.74 |
| 2002/0039209 | A1 | * | 4/2002 | Parker et al. | 359/15 |

FOREIGN PATENT DOCUMENTS

JP      03257939 A    * 11/1991

OTHER PUBLICATIONS

WO 98/06560; Narang et al; Feb. 1998; abstract.*

* cited by examiner

*Primary Examiner*—Tom Dunn
*Assistant Examiner*—Colleen P Cooke
(74) *Attorney, Agent, or Firm*—Synnestvedt, Lechner & Woodbridge LLP; Richard C. Woodbridge, Esq.; Roy Rosser (57) ABSTRACT

There is provided a system and method for ablating a surface of a work-piece comprising a radiation source for providing an ablating beam and a plurality of adjustable reflective masks having predetermined mask patterns thereon. The reflective masks are sequentially positioned relative to said radiation source and in the path of said ablating beam for reflecting said ablating beam onto the surface of the work-piece to ablate the work-piece.

2 Claims, 6 Drawing Sheets

METHOD, SYSTEM AND PRODUCT FOR PRODUCING A REFLECTIVE MASK MIRROR AND FOR ABLATING AN OBJECT USING SAID REFLECTIVE MASK MIRROR

BACKGROUND OF THE INVENTION

1. Field of the Invention

This invention relates to the field of laser projection patterning and more specifically to a system, apparatus, method and article of manufacture for providing real-time reflective mask creation and laser patterning.

2. Brief Description of the Prior Art

There is currently a need to produce precise laser patterns of inorganic or organic materials where the patterns define areas of desired material removal. Laser corrective eye surgery is one of many applications where precise customized ablation of predefined patterns is very important. Presently, mask patterning is achieved by one of several techniques: small spot scanning, slit scanning or by placing a transmissive mask in the beam path. While these methods can offer some level of customization, spot scanning accuracy is limited by spot size and positional accuracy, and masks have to be prefabricated at high cost. In addition, whenever a pattern needs modification a new mask pattern must be prepared which requires additional time and expense. In the case of laser corrective eye surgery, masks on hand may not offer close compliance to the individual surgery plan.

Another method for achieving desirable laser energy distribution over the work-piece surface uses active matrix of mirrors, such as the "Digital Micro-mirror Device" ("DMD") available from Texas Instruments("TI") and the "Thin Film Micromirror Array" ("TMA") available from Daewoo. However, neither, TI's DMD devices nor Daewoo's TMA devices are suitable for deep ultra-violet radiation applications. Laser eye surgery is performed at 193.3 nm wavelength, and most optical materials and process environments are very absorptive in this wavelength region. Creating highly accurate patterns with high optical efficiency poses a significant challenge. In laser eye surgery, patterns must be created as a part of the surgery procedure, and they must be based on corneal topography measurements. Furthermore, patterns may need to be changed during the course of surgery or several patterns may need to be layered over the same surface.

In the areas of non-tissue material processing, laser ablation techniques have been implemented that use transmissive masks as the patterning elements in lithographic projections systems where the illumination source is an excimer laser.

The present invention is directed to a novel, inventive and inexpensive approach that provides for real-time reflective mask creation and laser patterning.

SUMMARY OF THE INVENTION

In accordance with one aspect of the present invention, there is provided a system and method for ablating a surface of a work-piece. The system comprises: a radiation source for providing an ablating beam and a plurality of adjustable reflective masks having predetermined mask patterns thereon. The reflective masks are sequentially positioned relative to the radiation source and in the path of the ablating beam for reflecting certain portions of the ablating beam onto the surface of the work-piece.

In accordance with a second aspect of the present invention, there is provided a method for creating a reflective mask for ablation, comprising the steps of: sequentially selecting a reflective material having a reflective surface and generating a predetermined mask pattern on the reflective surface using either a printer or a micro-mirror array and laser combination.

In accordance with a third aspect of the present invention, there is provided a method for ablating a surface of a work piece, comprising the steps of: generating a predetermined mask pattern on a reflective substrate to produce a reflective mask; exposing the reflective mask to a radiation source to produce a reflected laser beam of certain shape; imaging the reflected laser beam onto the surface of the work-piece to ablate the surface of the work-piece; and repeating the forgoing steps, if necessary, to sequentially process a next predetermined mask pattern.

These and other features, aspects, and advantages of the present invention will become better understood with regard to the following description, appended claims, and accompanying drawings.

BRIEF DESCRIPTION OF THE DRAWINGS

Turning to the drawings.

DETAILED DESCRIPTION OF THE PREFERRED EMBODIMENT

Referring more specifically to the drawings, for illustrative purposes the present invention is embodied in the system, apparatus, method and article of manufacture generally shown in FIGS. 1–6. It will be appreciated that the system, apparatus, method, and article of manufacture may vary as to the details of its configuration and operation without departing from the basic concepts as disclosed herein.

Figure 1:
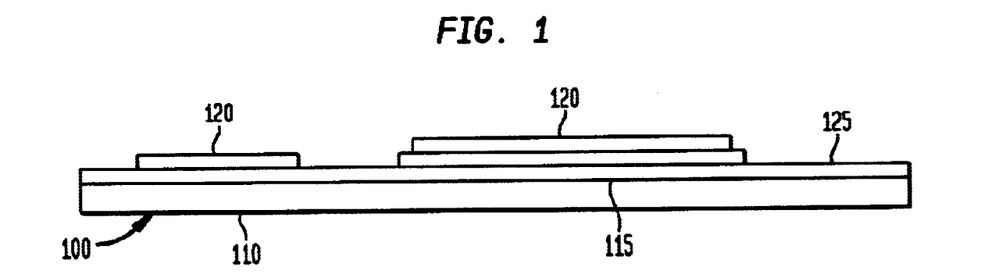
FIG. 1 is a cross-sectional view of a printed reflective mask used in the present invention.

There is shown in FIG. 1a cross-sectional view of a preferred embodiment of a printed reflective mask mirror that is used in the present invention. In a more basic embodiment, the printed reflective mask consists of a reflective material layer having a reflective surface such as foil or film. Preferably, however, and as shown in FIG. 1, the printed reflective mask 100 comprises a reflective material layer 115 having a reflective surface 125, a carrier 110, and an absorptive layer or coating 120.

Suitable materials for reflective layer 115 include metals and alloys such as gold, aluminum, chromium, platinum, silver, nickel or the like. Reflective layer 115 can also comprise other reflective materials known to those skilled in the art including organic materials, inorganic materials, dielectric coatings and multi-layer dielectric stacks. Whatever the desired choice of material for the reflective layer, the reflective material used in the mask must match the desired wavelength of operation of the radiation source used in the present invention. For example, aluminum is suitable for Ultra Violet (UV), while gold is suitable for Infrared (IR).

Reflective layer 115 can be fabricated on substrate or carrier 100 using techniques known to those skilled in the art. Examples of such techniques include lithographic (resist) technology and deposition by known techniques such as chemical vapor deposition, sputtering, thermal evaporation or pulsed laser deposition. Carrier 100 can be made of any suitable material, i.e. materials known to those skilled in the art, including organic materials and/or inorganic materials. Carrier 100 can even be made of the same material as the reflective layer. Additionally, carrier 100 can be made flexible, semi-flexible, or rigid. Furthermore, carrier 100 can be reusable or disposable.

Finally, the mask can also selectively be provided with a non-reflective or light absorptive layer or layers 120 that form/forms a predetermined pattern of ablation. Multiple absorptive layers can be stacked upon the other by multiple passes of the mask through the printer. Each absorptive layer can be varied such that it is smaller than the layer under it. In doing so, a thickness profile can be built such that the thicker areas take more pulses to ablate off the mask. Techniques such as inkjet printing, xerographic printing, direct laser writing, dye sublimation printing, and ablation patterning can be used to create a pattern in the absorptive layer.

Figure 2:
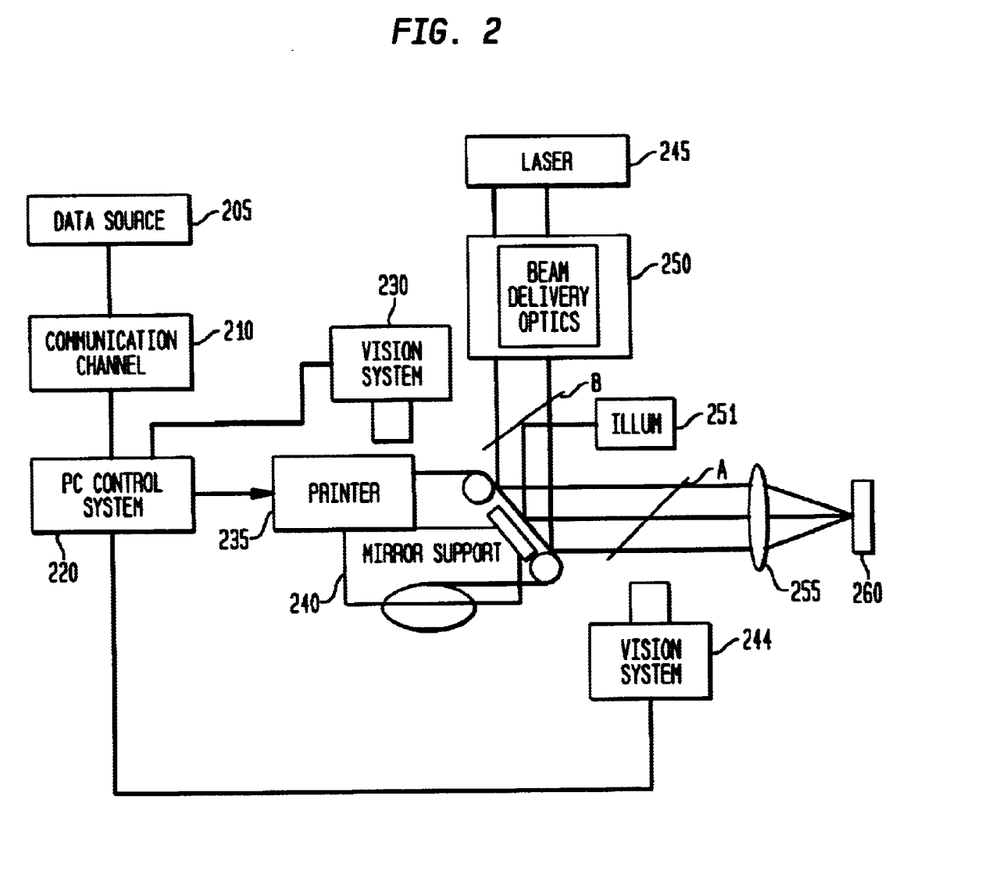
FIG. 2 is a schematic diagram of one embodiment of the present invention.

Referring to FIG. 2, there is shown a schematic diagram of one embodiment of the present invention having a data source 205, a communication channel 210, a control system 220, vision systems 230 & 244, a device 235, a mask support 240, a radiation source such as a laser 245, beam delivery optics 250, partially reflecting mirrors A & B, a projection lens system 255 and an ablation site 260.

The mask pattern data that is data source 205 can come from various sources. For example, in the case of laser eye surgery, a corneal topography measurement system or master computer would provide a sequence of mask pattern data. In the case of micro-feature pattern generation (microelectronics, MEMS, flat panels), the mask pattern data would be provided from a design database. In addition, used or processed reflective masks can be stored and later used as a source of data.

Device 235 is used to create the reflective mask. Preferably, device 235 is any conventional high quality printing device however, the invention is not limited thereby. Device 235 can also be customized for the particular system and application. Device 235 can create the reflective mask in several ways. For example, device 235 can generate the mask pattern on the reflective surface of reflective mask 100 by depositing an absorptive coating such as ink, paint, powder, or any other opaque light blocker on the reflective surface of the reflective layer. Alternatively, given a reflective layer that has been pre-deposited with an absorptive layer, device 235 can remove selective areas of the absorptive layer by etching, ablating or mechanically removing the absorptive layer. Still alternately, device 235 can selectively modify the reflective characteristics of a mask by creating small abrasions or miniature pock marks in the reflective layer using, for example, the pin elements of a dot matrix printer. The marked regions would have dramatically reduced reflectance characteristics due to surface roughening. Still other techniques can be used where the absorptive coating is replaced with a diffractive grating that will diffract the radiation in the desired dark areas to outside the projection optics or lens. This method does not require the mask to absorb the incident laser energy in the dark areas.

In any event, the non reflective areas would absorb or scatter the ablating laser beam, the exposed reflective areas would reflect the ablating laser beam towards the projection optics or lens and the roughened surface regions. would either scatter or absorb the ablating laser beam.

Vision system 230 monitors the reflective mask creation process. Vision system 230, which comprises a camera and a vision processor, captures an image of a newly created reflective mask, processes the image and using a predetermined matching algorithm, compares the image with the digital mask pattern used to create the reflective mask. If any discrepancies exist between the two, the reflective mask can be discarded and a new reflective mask can be created. If desired, tolerances in the matching algorithm can be programmed to suit the particular application.

Reflective mask support 240 securely positions the reflective mask in the path of the ablating laser beam. Mask support 240 maintains surface flatness of the reflective mask, allows controlled motorized motions to ensure proper alignment of the reflective mask and the work-piece and assists, if necessary, in removing heat (generated during the ablating process) from the reflective mask. Mask support 240 can optionally be temperature controlled to maintain mask pattern distortions and ensure proper alignment within a desired tolerance level.

Depending on the particular application, radiation source 245 is any number of well-known types of lasers including, but not limited to, excimer lasers, infrared lasers, shuttered infrared lamps, frequency multiplied diode pumped solid state lasers, and copper vapor lasers. For example, some applications will require a short wavelength illumination pulsed at hertz to multi-kilohertz frequencies while other applications will require long wavelength illumination.

Beam delivery optics 250 shapes the laser beam profile by using a homogenizer and apertures, and delivers an ablating laser beam of appropriate density to the reflective mask. Beam delivery optics 250 are conventional components, well known in the art.

Vision system 244 also comprises a camera and a vision processor. Together with partially reflecting mirrors A & B, vision system 244 monitors the laser processing operation. Preferably, this is done via a feedback loop that controls image placement to align the pattern with the work-piece. The camera observes the work-piece and the pattern projected onto the work-piece to determine if proper alignment is being achieved. If there is a shift between the work-piece and the projected pattern, the reflective mask is adjusted in the plane perpendicular to the projection optical axis.

Projection lens 255 demagnifies and refocuses the reflected beam over the surface of the work-piece to perform customized ablation of the work-piece. During de-magnification, the laser fluence at the reflective mask plane [is] held below the ablation threshold while the energy density at the work-piece plane is held above the ablation threshold. However, depending on the desired application, the magnification ratio of mask-object to image can be either less than 1 or greater than 1 or equal to 1.

Illuminator 251 projects a low power image of the mask pattern on the surface of the work-piece at ablation site 260 for alignment purposes. Illuminator 251 uses a wavelength suitable for illuminating the work-piece at a low energy level thereby preventing any damage or changes to the work-piece.

Control system 220 coordinates mask motions (i.e. drives device 235's functions), triggers the radiation source and tracks the position of the work-piece. For example, control system 220 receives mask pattern data from data source 205 through any suitable communication channel 210. Control system 220 transforms the mask pattern data into a format suitable for use by device 235. Once a pattern is printed, control system 220 verifies that the printed pattern matches the design data within tolerance. This is accomplished by vision system 230 acquiring an image of the printed mask, analyzing the image, comparing the image against the design data, and reporting an 'accept' or 'reject' signal to control system 220. If the printed mask is rejected, control system can automatically attempt another print or it can halt operation and report an error. If the printed mask is accepted, control system 220 indexes the mask to the working position where it is securely positioned by mask support 240.

Each mask created by device 235 can be individually inserted or they can be connected in a continuous manner to form a mask frame. This mask frame can be a film strip or a circular disk that can be rotated to access different patterns. Long flexible mask strips can be handled similar to film with sprocket drives while long rigid mask strips can be indexed like glass plates. Each mask frame can contain reference alignment marks and other identifying indicia, preferably located in the periphery of the frame. Identifying indicia can include product part numbers, serial numbers, patient information, date of printing, and other alphanumeric or matrix coded data or identifying indicia.

The masks can be indexed during operation such that one mask receives anywhere from one to N laser pulses. The maximum, N, is determined by the mask lifetime relative to the radiation that impinges on it. A number of pulses M, where M<N, can be used if the amount of material processing dictates less pulses.

Once properly positioned, illuminator 251 illuminates mask 100 to project an image of the mask pattern towards the work-piece at the ablation site 260 for alignment purposes. Vision system 244 acquires an image of the projected mask pattern and a select reference feature from ablation site 260, compares the relative location, and provides offset data to control system 220. Control system 220 adjusts the lateral position of the mask by moving the mask support 240 to properly align the projected pattern to work-piece. The vision system 244 verifies that proper positioning has occurred. Once the alignment is verified, control system 220 turns off illuminator 251 and commands the laser to emit a select number of pulses. This sequence can be repeated at the same location on the work-piece or at different locations until the desired ablation results are achieved.

Ablation site 260 holds the work-piece during ablation. The work-piece is any organic or inorganic material.

Figure 3:
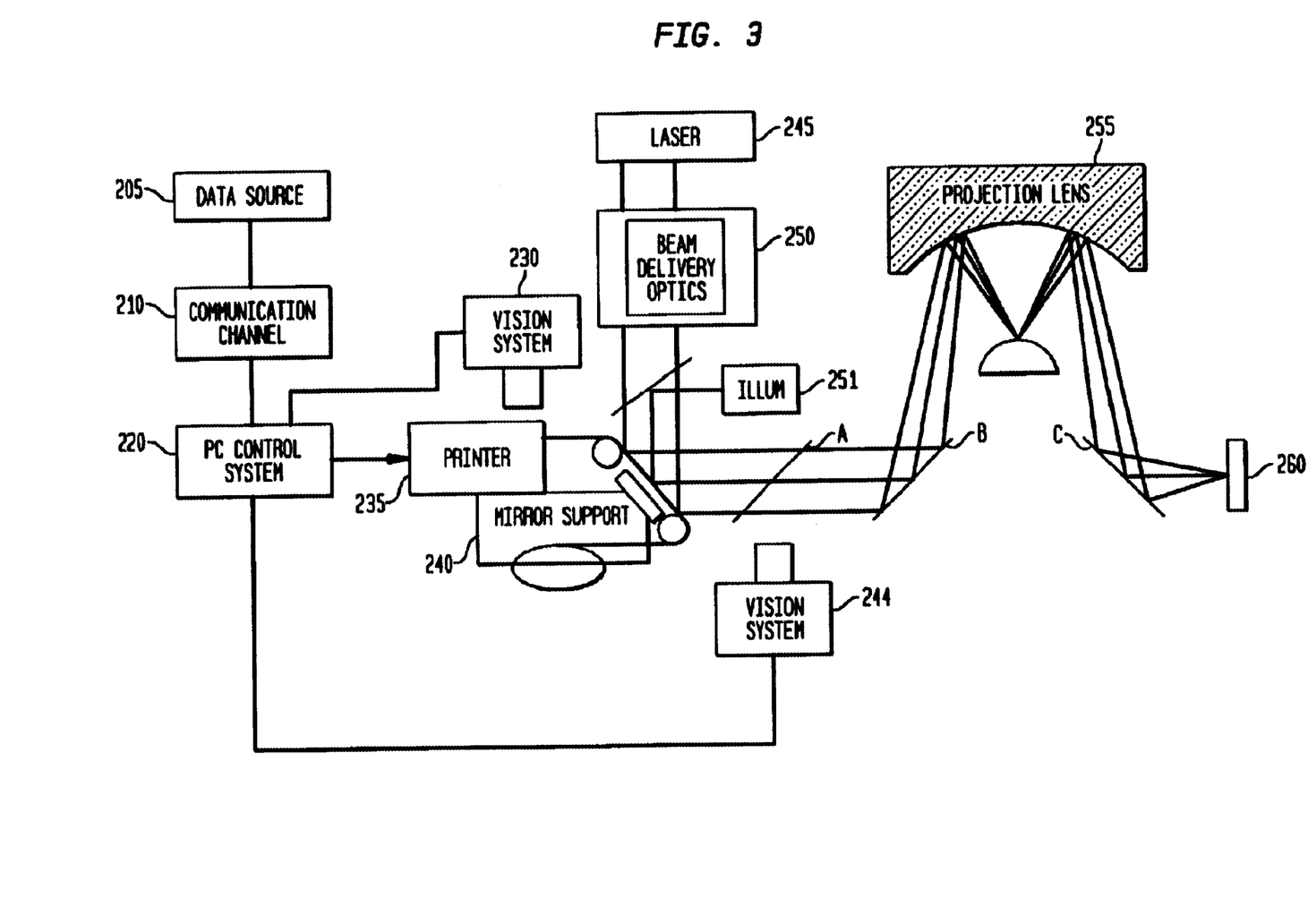
FIG. 3 is a schematic diagram of a second embodiment of the present invention.

Referring to FIG. 3, there is shown a schematic diagram of the present invention having a data source 205, a communication channel 210, a control system 220, vision systems 230 and 244, a device 235, a mask support 240, a radiation source such as a laser 245, beam delivery optics 250, illuminator 251, a projection lens system 255, partially reflecting mirrors A, B, C, & D and an ablation site 260. Unlike the projection lens system 255 of FIG. 2, which is an all-refractive design, here projection lens system 255 is an all-reflective design. Still, other types of projection lens systems can be utilized such as an reflective/refractive combination. In any event, such lens systems are conventional components that are well known in the art.

Figure 4:
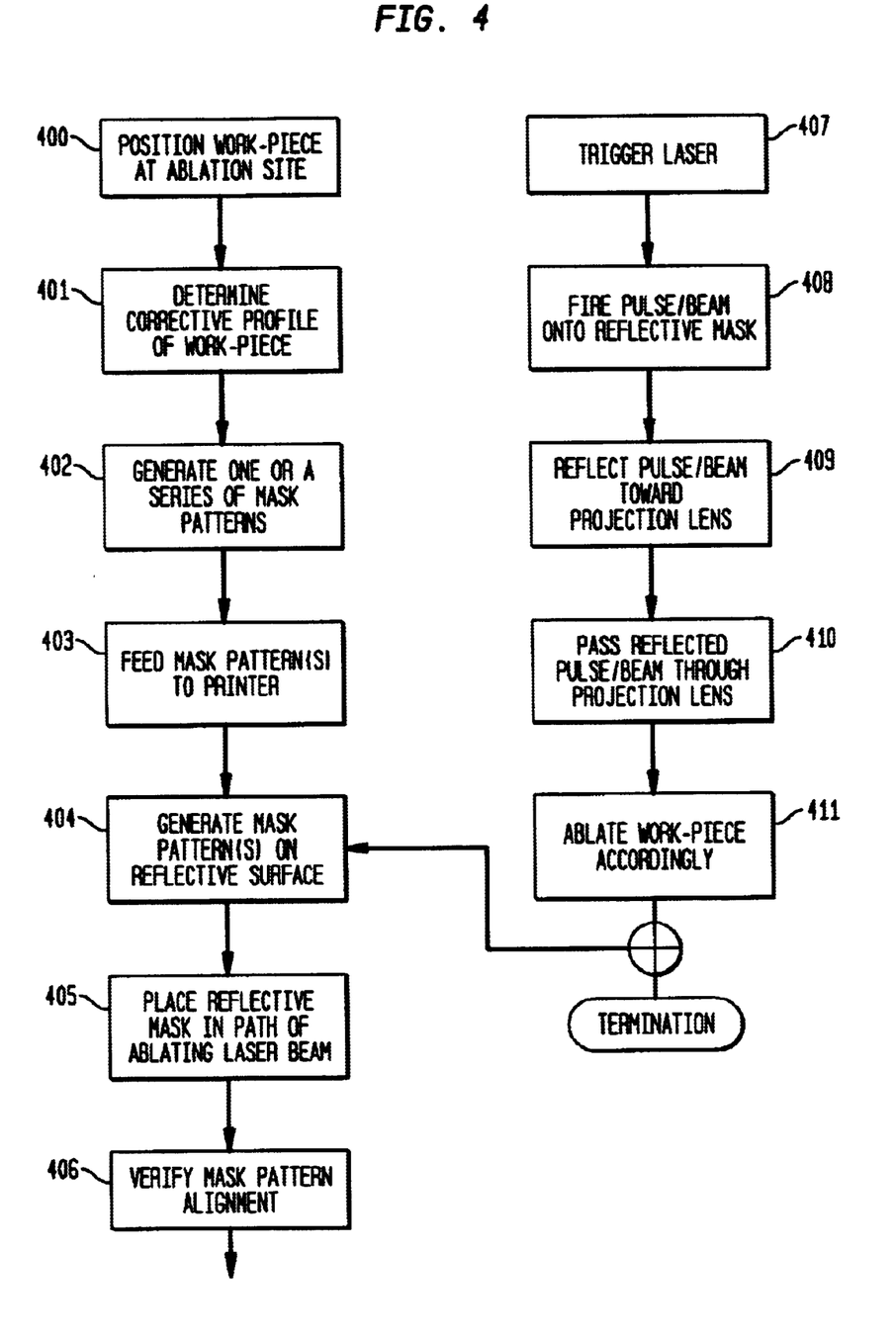
FIG. 4 is a flowchart describing one method of operation of the embodiments shown in FIGS. 2 and 3.

Referring to FIG. 4, the embodiments of FIGS. 2 & 3 generally operate as follows: at step 400, the work-piece is positioned at ablation site 260. At step 401, a corrective profile of the work-piece is determined by using data and methods (data source 205) that are well known in the art. For example, Monitors for profiling corneas are well-known in the art and are commercially sold under the trade name Keratron and manufactured by Optikon 2000. Details on corneal profilers may be found in U.S. Pat. No. 4,863,260 issued to Gersten et al. and assigned to Computed Anatomy Inc. U.S. Pat. No. 4,863,260 is expressly incorporated by reference. This data is then fed to control system 220.

At step 402, based on the corrective profile, control system 220 determines either one or a series of mask patterns. Each mask pattern would correspond to an area to be removed from the work-piece and several masks could be used in one work-piece region to create a desired three-dimensional profile. At step 403, control system 220 forwards the mask pattern or the series of mask patterns to device 235. At step 404, device 235 prints a mask pattern on the reflective surface of the reflective mask.

At step 405, control system 220 positions the printed. reflective mask in the path of the ablating laser beam.

At step 406, vision system 244 checks to see if the mask pattern is properly aligned with the work-piece using illuminator 251. If the work-piece or projected pattern has shifted, reflective mask 100 is adjusted in the plane perpendicular to the projection optical axis.

At step 407, computer 220 triggers laser 245.

At step 408, laser 245 fires a laser pulse or beam through the beam delivery optic 250 onto the positioned reflective mask. Beam delivery optic 250 transforms the fired laser beam into a homogenous and directed ablating laser beam of appropriate energy density and width according to well-known techniques.

At step 409, in accordance with the mask pattern printed on the reflective mask, certain portions of the ablating laser beam are absorbed while other portions of the ablating laser beam are reflected through the partially reflecting mirrors towards projection lens 255.

At step 410, the reflected laser beam passes through projection lens 245 where it is refocused or de-magnified before it reaches the work-piece at ablation site 260.

At step 411, the work-piece is ablated accordingly.

If all mask patterns in a series are not completed at step 411, the operation returns to step 404, so that the next mask pattern is configured for the next ablating laser beam. When all the mask patterns are completed, the process terminates at step 411.

Figure 5:
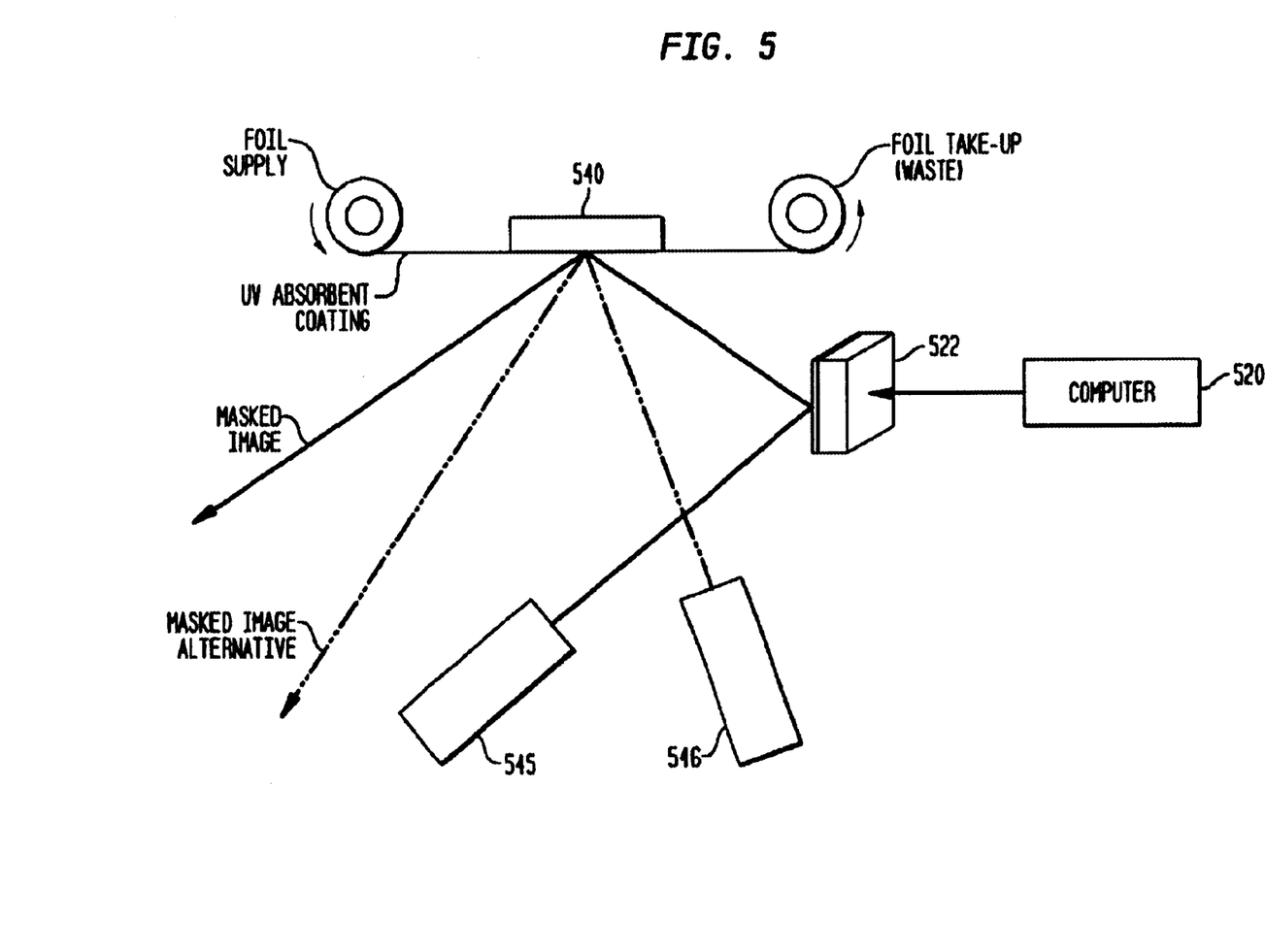
FIG. 5 is a schematic diagram of a third embodiment of the present invention.

FIG. 5 is a schematic view of a detail of a third embodiment of the present invention comprising a computer as control system 520, a micro-mirror array 522, a radiation source 545/546 and a mask support 540.

Preferably, micro-mirror array 522 used herein is the well-known "Digital Micro-mirror Device" ("DMD") available from Texas Instruments("TI"), Dallas Texas or some other similar device. Alternatively, a "Thin Film Micromirror Array" ("TMA") available from Daewoo can be subsituted for the DMD. The following brief description of the DMD borrows from the literature of TI. The reader is urged to reference the literature for a more detailed explanation.

DMD 522 is an array of aluminum mirrors. Each mirror is supported on a pivot that is attached to a substrate. The DMD contains its own addressing circuitry for each mirror. An interface board converts the signals from a computer to the waveforms required by the addressing circuitry of the DMD. Each mirror is configurable and tiltable about its own pivot to the "on" position to reflect laser light onto a target or to the "off" position to reflect laser light away from a target. As shown in FIG. 5, the DMD is positioned out of the ablation or optical path.

Here, a continuous strip of foil tape is the preferred reflective mask material. This foil is substantially covered with an UV absorbing coating, such as PMMA.

Preferably, a work-piece tracker or vision system 544 tracks the position of the work-piece during the mask creation and ablation process.

DMD 522, together, with laser 545, creates the reflective mask. This DMD-Laser combination creates a spatially corrected mask pattern on the foil.

Figure 6:
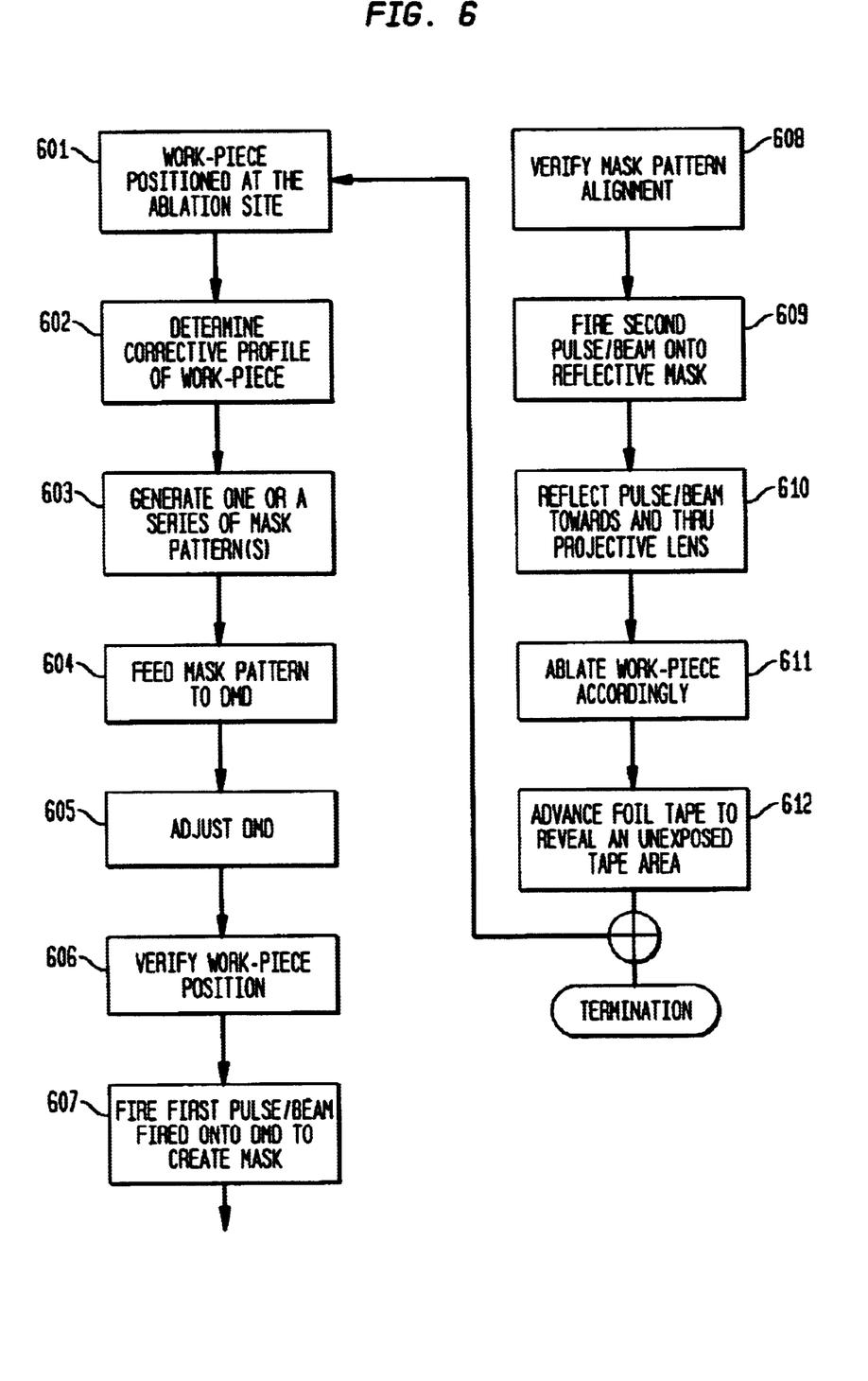
FIG. 6 is a flowchart describing one method of operation of the embodiment shown in FIG. 5.

Referring to FIG. 6, the embodiment of FIG. 5 generally operates as follows: at step 601, the work-piece is positioned at the ablation site. At step 602, a corrective profile of the work-piece is determined using data and methods that are well known in the art. At step 603, this corrective profile is fed into computer 520. Based on the corrective profile, computer 520 determines either one or a series of mask patterns. Each mask pattern would correspond to an area to be removed from the work-piece and several masks could be used in one work-piece region to create a desired three-dimensional profile.

At step 604, computer 520 sends a mask pattern to DMD 522. At step 605, computer 520 adjusts DMD 522 by moving certain of the mirrors to the ON position and the remaining mirrors to the OFF position in accordance with the predetermined mask pattern. At step 606, work-piece tracker or vision system 544 monitors and determines the position of the work-piece. At step 607, once the position of the work-piece is known, computer 520 programs laser 545/546 to fire a first laser pulse through the beam delivery optic 550 onto DMD 522. According to the ON/OFF positions of DMD 522, certain portions of the first laser pulse are absorbed while other portions of the first laser pulse are reflected towards the foil to ablate the desired mask pattern on the foil. The resulting ablated foil surface is now used as a reflective mask. At step 608, vision system 544 checks to see if the mask pattern is properly aligned with the work-piece, preferably, using an illuminator. If either the work-piece or the projected pattern has shifted, the reflective mask is adjusted accordingly. At step 609, laser 545/546 fires a second laser pulse, preferably, through a beam delivery optics onto the reflective mask. At step 610, in accordance with the mask pattern printed on the reflective mask, certain portions of the ablating laser beam are absorbed while other portions of the ablating laser beam are reflected towards a projection lens system. The reflected laser beam passes through the projection lens system where it is refocused or de-magnified before it reaches the work-piece. At step 611, the work-piece is ablated, accordingly. At step 612, the foil tape advances to reveal an unexposed area of tape and the mask creation and ablation process begins again to process the next mask pattern in series.

It should be noted that more than one DMD may be used in order to lower the average fluence on the mirrors, thus extending their life or, instead allowing for focusing lenses which increase fluence on the PMMA. By increasing fluence, a material may be chosen which requires a much higher fluence for ablation, than needed by the-work-piece. Alternatively, the same laser used to create the mask may be used in concert with the DMD in the full ON or OFF state to reflect all the energy onto the reflective mask. Moreover, a second laser, or a redirected beam from the primary laser may be used to illuminate the mask to create the masked image for the work-piece.

CONCLUSION

Having now described a preferred embodiment of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, equivalents or similar purpose, unless expressly stated otherwise. Therefore, numerous other embodiments of the modifications thereof are contemplated as falling within the scope of the present invention as defined by the appended claims and equivalents thereto;

What is claimed is:

1. A method for ablating a surface of a work-piece, comprising the steps of:

(a) generating a predetermined mask pattern of ablation on a reflective substrate to produce a reflective mask;

(b) exposing said reflective mask to a radiation source to produce a reflected laser beam of certain shape;

(c) imaging said reflected laser beam onto said surface of said work-piece to ablate said surface of said work-piece;

(d) repeating the forgoing steps if necessary to sequentially process next predetermined mask pattern; and (e) monitoring the reflective mask creation process.

2. A method for ablating a surface of a work-piece, comprising the steps of:

(a) generating a predetermined mask pattern of ablation on a reflective substrate to produce a reflective mask;

(b) exposing said reflective mask to a radiation source to produce a reflected laser beam of certain shape;

(c) imaging said reflected laser beam onto said surface of said work-piece to ablate said surface of said work-piece;

(d) repeating the forgoing steps if necessary to sequentially process next predetermined mask pattern; and (f) using a used reflective mask as a data source for generating said predetermined mask pattern.

\* \* \* \* \*